(No Model.)
A. J. PETERSON.
INSECT DESTROYER.
No. 418,054. Patented Dec. 24, 1889.
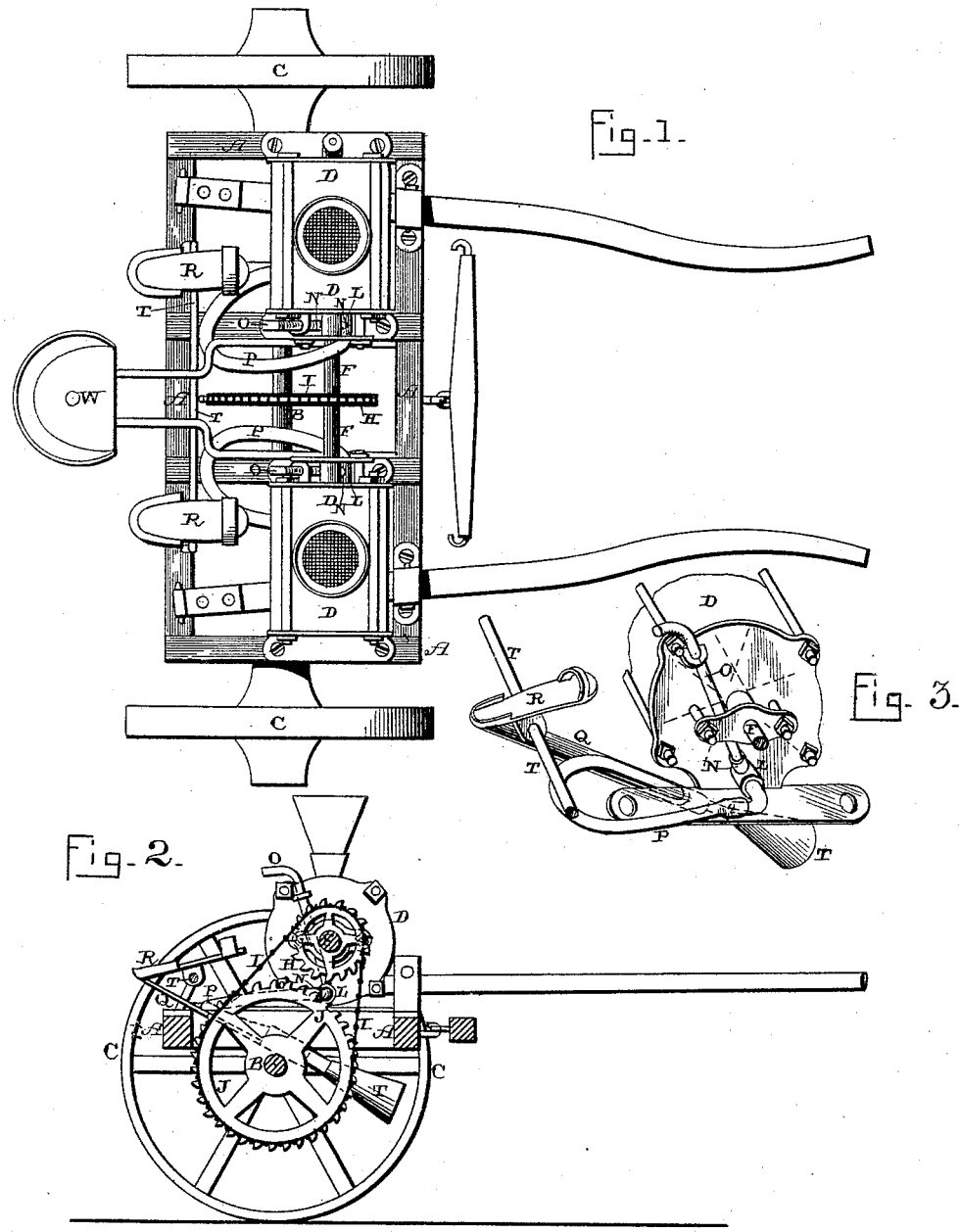
Witnesses:
E. P. Ellis
L. L. Burket
Inventor:
A. J. Peterson,
per F. A. Lehmann
Atty

UNITED STATES PATENT OFFICE.

ANDREW JOHN PETERSON, OF NORTH BRANCH, MINNESOTA, ASSIGNOR OF ONE-HALF TO FRED. KREGER, OF SAME PLACE.

INSECT-DESTROYER.

SPECIFICATION forming part of Letters Patent No. 418,054, dated December 24, 1889.

Application filed July 19, 1889. Serial No. 317,982. (No model.)

*To all whom it may concern:*

Be it known that I, ANDREW JOHN PETERSON, of North Branch, in the county of Isanti and State of Minnesota, have invented certain new and useful Improvements in Insect-Destroyers; and I do hereby declare the following to be a full, clear, and exact description of the invention, such as will enable others skilled in the art to which it pertains to make and use it, reference being had to the accompanying drawings, which form part of this specification.

My invention relates to an improvement in insect-destroyers; and it consists in a suitable frame mounted on wheels, a tank or tanks placed upon the frame, a shaft which passes through the tank or tanks and is provided with suitable stirrers inside the tanks, a flexible tube or tubes through which the poisonous fluid passes, foot-rests to which the tubes are loosely connected, the guides upon which the foot-rests move, and the sprinklers attached to the tubes, as will be more fully described hereinafter.

The object of my invention is to provide an insect-destroyer in which the sprinklers are connected to and operated entirely by the foot-rests, which are moved laterally upon a suitable guide provided for them, leaving the driver's hands free to manage the team.

Figure 1 is a plan view of a machine embodying my invention. Fig. 2 is a vertical section taken to one side of the driving-wheels. Fig. 3 is an enlarged detail view.

A represents a suitable frame-work, which is mounted upon the axle B, to which one of the driving-wheels C is rigidly secured, so as to cause it to revolve, and upon which the other driving-wheel is loosely placed.

Mounted upon the frame A are the two tanks D, in which the poisonous fluid is placed, and through which the shaft F, carrying suitable stirrers, pass. Upon this shaft F is a wheel H, around which passes a chain I from the driving-wheel J, secured to the axle B, for the purpose of keeping the shaft F and the stirrers secured thereto in constant motion while the machine is moving. The stirrers serve to keep the poison from sinking to the bottom of the tanks, as it would do if no stirrers were used to keep it constantly moving through the water.

Extending from the ends of the tanks are short metallic pipes L, in which are placed suitable stop-cocks N, which are operated by the rods O, which extend up within easy reach of the driver, so that he can turn on or shut off the flow of the poisonous fluid whenever he sees fit. To these metallic pipes are fastened the flexible tubes P, through which the poison passes, and which tubes have their lower ends to pass through or rest in the guides Q, which project diagonally downward and forward from the foot-rest R. To the lower ends of the tubes are secured the sprinklers T. The foot-rests R are placed upon the horizontal guide T, which is secured to the rear end of the frame, and they are made to be freely moved back and forth by the driver's feet for the purpose of guiding the sprinklers so as to direct the poisonous fluid directly upon the growing plants.

In the management of a machine of the nature here shown and described it is very necessary that the driver's hands should be left entirely free, so as to both manage the animal drawing the machine and keep it from treading upon the rows of the growing plants and to be able to stop the flow of the poisonous fluid from either one or both of the tanks whenever so desired. For this reason the devices are attached directly to the foot-rests, and these rests are made laterally adjustable upon a guide especially prepared for them. The driver, sitting upon the seat W, has but to move the foot-rests back and forth upon the guide to direct the poison in any direction.

In order to take all of the strain from the guides or supports attached to the foot-rests, they are made to project forward and the sprinklers bear directly upon the top of the axle, so as to hold them in an operative position.

Having thus described my invention, I claim—

1. In an insect-destroyer, the combination of a foot-rest, a guiding-rod upon which the foot-rest is placed, the metallic guide Q, which is secured to the foot-rest, the pipe or tube P, which extends from the tank, and the sprinkler T, which is supported upon the lower end of the support, substantially as shown.

2. The combination of the tanks, the shaft provided with stirrers or wheels, and the driving-chain, with the stop-cocks, the pipes or tubes which extend from the tanks and make connection with the sprinklers, the foot-rests, the rod upon which the foot-rests have a lateral movement, the metallic supports attached to the foot-rests, and the sprinklers placed upon the metallic supports, substantially as described.

In testimony whereof I affix my signature in presence of two witnesses.

ANDREW JOHN $\overset{\text{his}}{\times}$ PETERSON.
$\phantom{ANDREW JOHN \times}$ mark Witnesses:
GEO. C. STARR,
ANDREW L. WILSON.